US006814567B2

(12) United States Patent
McKovich

(10) Patent No.: US 6,814,567 B2
(45) Date of Patent: Nov. 9, 2004

(54) FRAME CAVITY COVER PLATE FOR INJECTION MOLDING SYSTEM

(76) Inventor: Daniel McKovich, 6849 U. S. Hwy. 158, Stokesdale, NC (US) 27357

( * ) Notice: Subject to any disclaimer, the term of this patent is extended or adjusted under 35 U.S.C. 154(b) by 26 days.

(21) Appl. No.: 10/122,003

(22) Filed: Apr. 15, 2002

(65) Prior Publication Data

US 2003/0194465 A1 Oct. 16, 2003

(51) Int. Cl.$^7$ ............................................. B29C 45/40
(52) U.S. Cl. ................... 425/556; 264/334; 425/436 R; 425/444
(58) Field of Search ............................ 425/556, 436 R, 425/441, 443, 73, 151, 210, 135, 544, 116, 444; 264/334

(56) References Cited

U.S. PATENT DOCUMENTS 4,259,052 A * 3/1981 Imanishi et al. ............ 425/135
4,997,355 A * 3/1991 Yamauchi et al. .......... 425/116

* cited by examiner

Primary Examiner—Tim Heitbrink

(57) ABSTRACT

An ejector housing cover plate for an injection mold system having an upper stationary portion and a lower movable portion. The upper portion has a support member and a cavity core, while the lower portion has a frame defining an interior opening, support member and a frame core. An ejector system is positioned within the opening and is movable to eject newly molded products when a molded product has been formed. The opening in the frame can result in the collection of dust, moisture and other foreign materials inside the opening and the possible damage to the mold or ejector system, so an ejector system cover plate is provided. The cover plate covers the opening during operation of the system and when the system is inactive or stored.

21 Claims, 7 Drawing Sheets

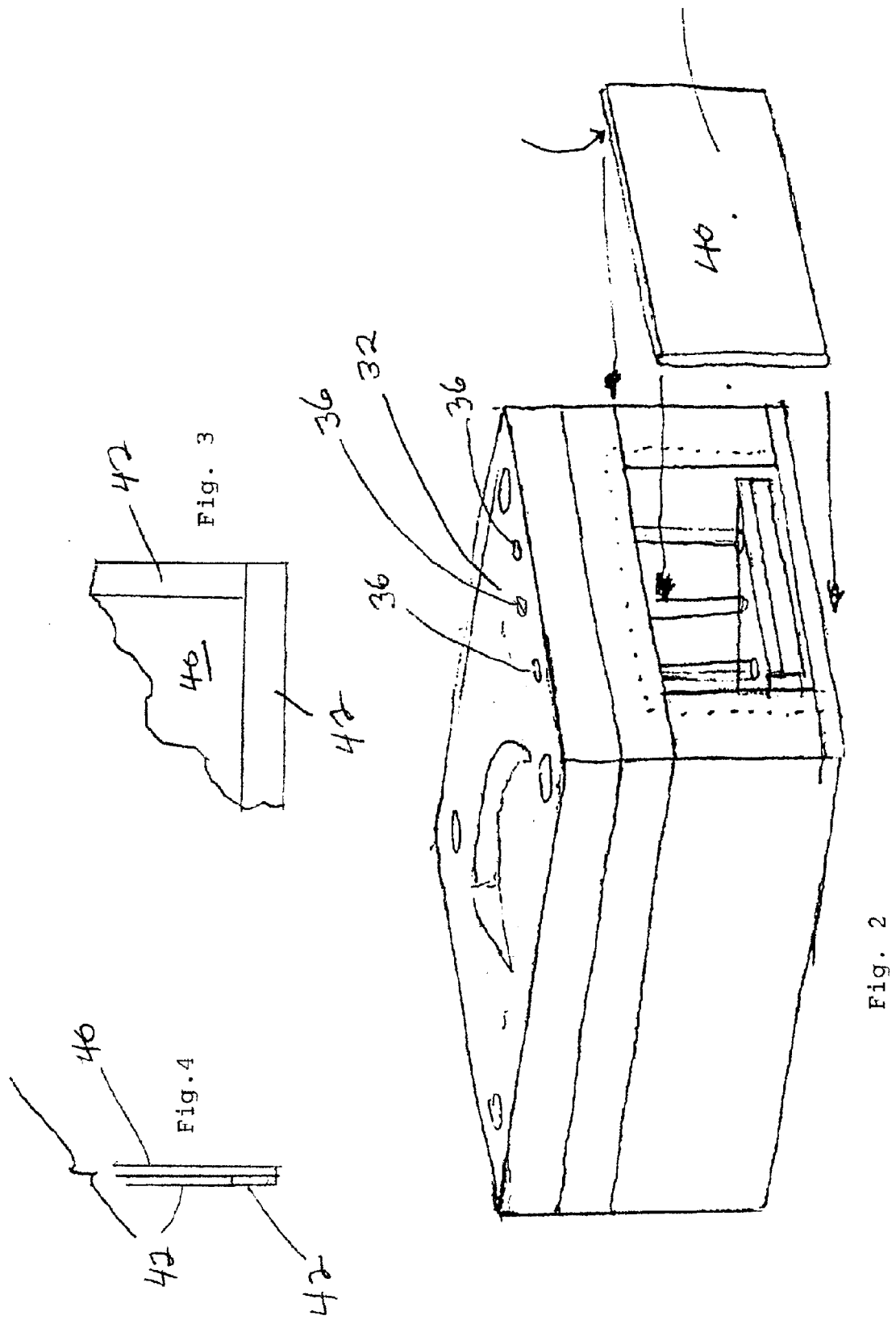

FRAME CAVITY COVER PLATE FOR INJECTION MOLDING SYSTEM

BACKGROUND OF THE INVENTION

1. Field of the Invention

The present invention is for an improvement in an injection mold and, more particularly, to a housing cover plate for an injection mold to prevent dust, water and other foreign materials from affecting operation of the mold.

2. Description of the Prior Art

Injection molding of plastics to form articles of utility for a variety of industries has fast become the most convenient and acceptable method for forming plastic products of all varieties. An injection mold is made up of two sections, one having an upper cavity core and a supporting member and the other (usually movable) having a lower cavity core and a support member. Standard injection mold components are associated with these pieces of equipment with the movable portion surrounded by a base, side walls and a top formed by the support member all of which define a housing having end openings maintaining a movable ejector assembly. The ejector assembly includes several individual levers which function cooperatively to eject molded products from the mold as they are formed. Each of the cavity cores are affixed to their associated support member. The cavity cores are made with the product design to be molded; i.e., when they are brought together, the cores engage each other and together form a full mold for the product. In operation, the lower portion moves to the upper portion with great pressure, and a particulate plastic or other suitable material in liquid form is forced into the closed core or fully formed mold.

After molding and the upper and lower portion (including the cavity cores) are fully separated, the ejector assembly moves the mold-formed article away from the mold for cooling and additional finishing if that is needed. The housing formed by the bottom, side walls and lower support member is open at each end exposing the housing interior and a part of the ejecting system. During operation, the ejector housing in which a part of the mold resides is constantly changing in size and configuration depending upon the location of various components within the opening at any given time.

Because of the great forces required to operate the injection mold and the exposed openings in the frame, there is a possibility that dust, trash, airborne particles, moisture, ejected molded products or other foreign and undesirable materials can enter the housing during machine operation and cause great damage to the mold or its components. Even when the mold is inactive or even in storage, dirt or other trash can collect in the interior through these openings thus requiring extensive cleaning and servicing before re-activation. Thus protection from and prevention of such activity is critically needed to prevent mold or component damage and avoid costly shutdowns. It is to this need that the present invention is directed.

OBJECTIVES AND BRIEF SUMMARY OF THE INVENTION

It is a primary objective of the present invention to provide an effective and cost efficient device to prevent the entry or collection of dirt, moisture and unwanted other materials into the ejector housing of an injection mold when the machine is active or inactive.

Another objective of the invention is to provide a device of the type described that can be quickly installed and removed with or without the use of tools or other components.

Yet another objective of the present invention is to provide a device of the type described that can be made from a variety of inexpensive materials.

A further objective of the invention is to provide a device of the type described that can be used, attached or detached in different ways.

The present invention is a device meeting the objectives described and is a cover plate which is preferably a section of flat stock material generally rectangular in configuration of a size sufficient to cover and close the openings in an injection mold. The cover plate overlaps all edges of the opening and is held in place by metallic tape, clips and fasteners or any other adhering elements that will engage it at the overlapping locations and hold it in position over the cavity opening.

On occasion in the written description that follows, reference will be made to the opening in the mold as "mold opening," "ejector housing opening," and "opening." When so used, it is to understood that they all refer to the same element, the opening in the mold formed by the bottom and side walls and the lower support member residing on the two sides of the mold.

Another use for the present invention is as a logo carrying or supporting component since it is readily observed by even the most fleeting glance of an individual generally present at a location near the mold. Mold builders can use the present invention on a new mold or on repaired or renovated molds to bring the name of the manufacturer prominently before potential customers and satisfied users.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention, which is measured by its claims, nor to limit its scope in any way.

Thus, the objectives of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

The drawings are included to provide a further understanding of the invention and are incorporated in and constitute a part of this specification. They illustrate embodiments of the invention and, together with their description, serve to explain the principles of the invention.

BRIEF DESCRIPTION OF THE DRAWINGS

FIG. 2 is a perspective and exploded view of a mold stationary lower portion away from which the mold opening cover plate of the present invention has been alignably displaced;

FIG. 3 is a partial plan and fragmentary view of one corner of the cover plate of the present invention showing the positioning of the securing material used to hold the cover plate in an overlapping relationship with the mold opening;

FIG. 4 is a partial, end elevational and fragmentary view of the corner of the cover plate shown in FIG. 3;

DETAILED DESCRIPTION OF THE PREFERRED EMBODIMENT

Figure 1:
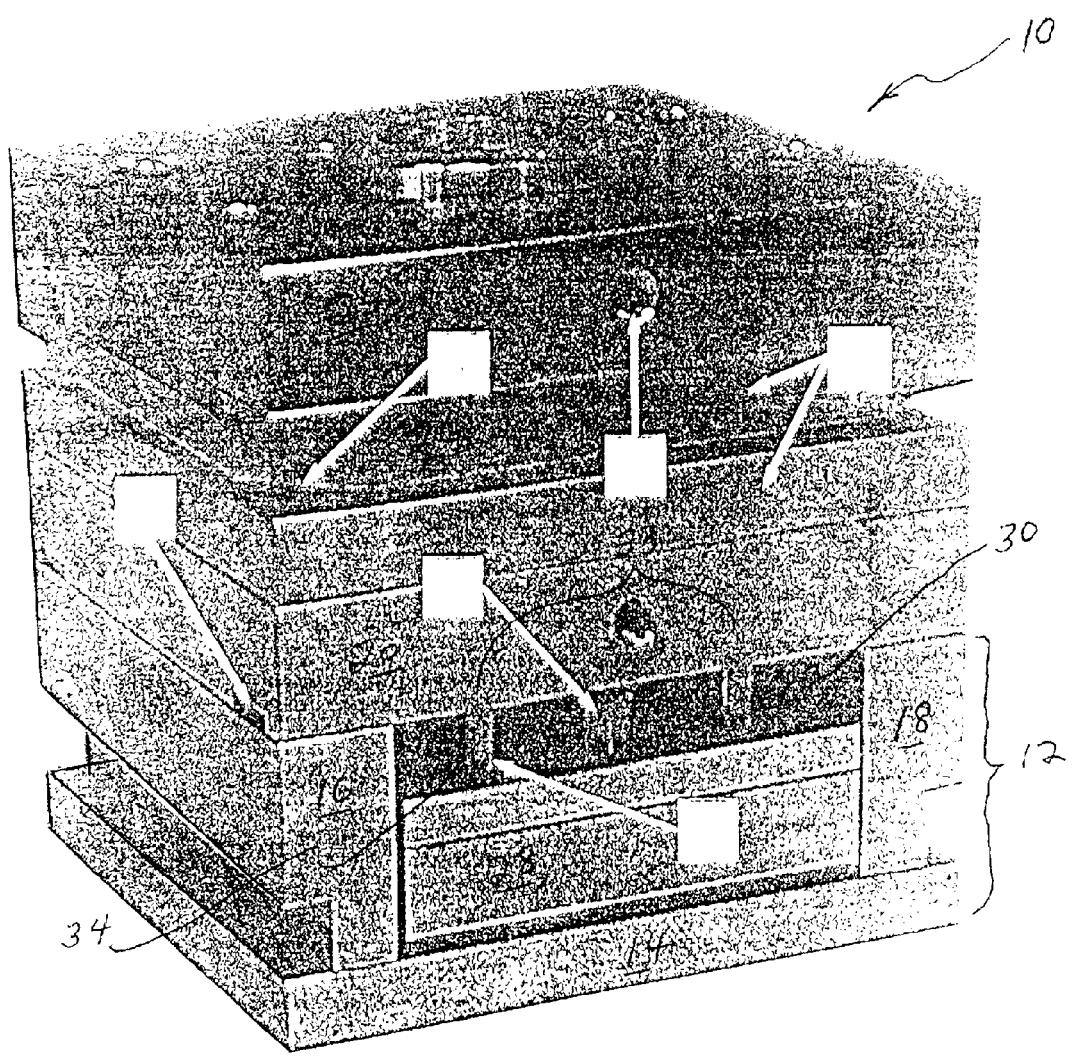
FIG. 1 is a perspective view of a conventional injection mold to which the present invention relates and on which the present invention is used.
Figure 5:
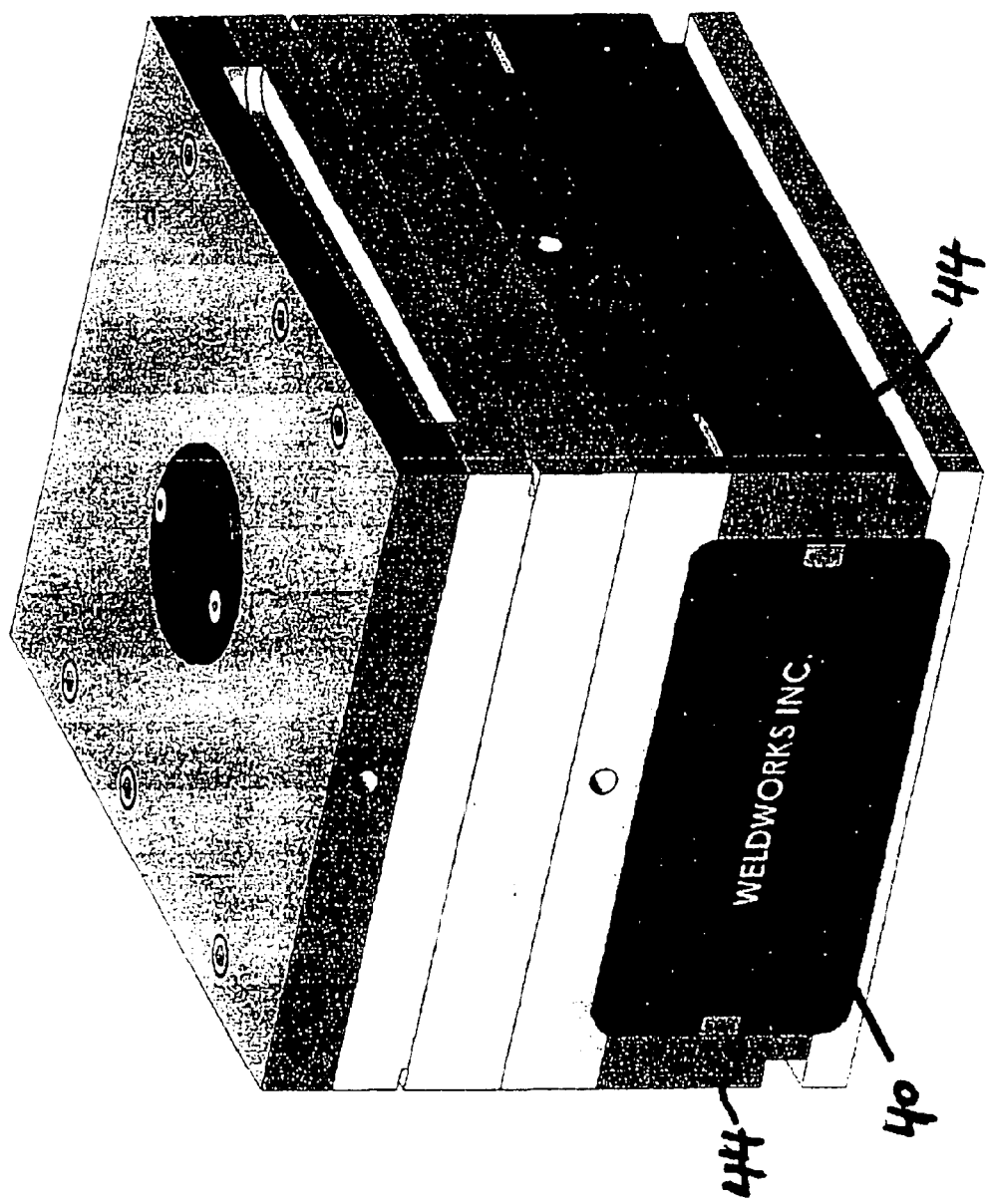
FIG. 5 is a partial and perspective view of a mold upper and lower portion to which has been attached the mold opening cover plate of the present invention.
Figure 6:
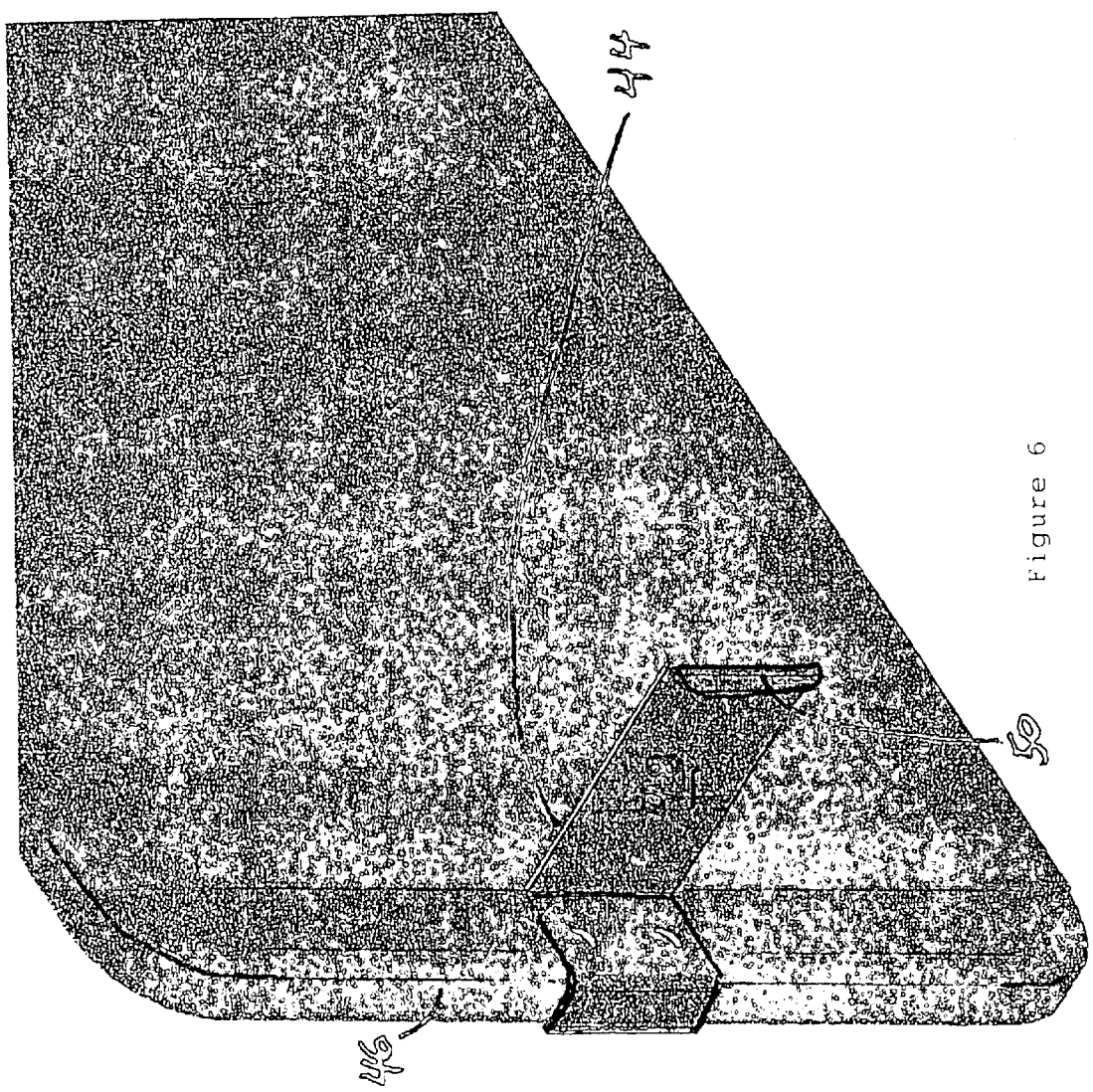
FIG. 6 is an enlarged, fragmentary and perspective of the cover plate of the present invention showing the clip used in one embodiment to attach the cover plate to the mold.
Figure 7:
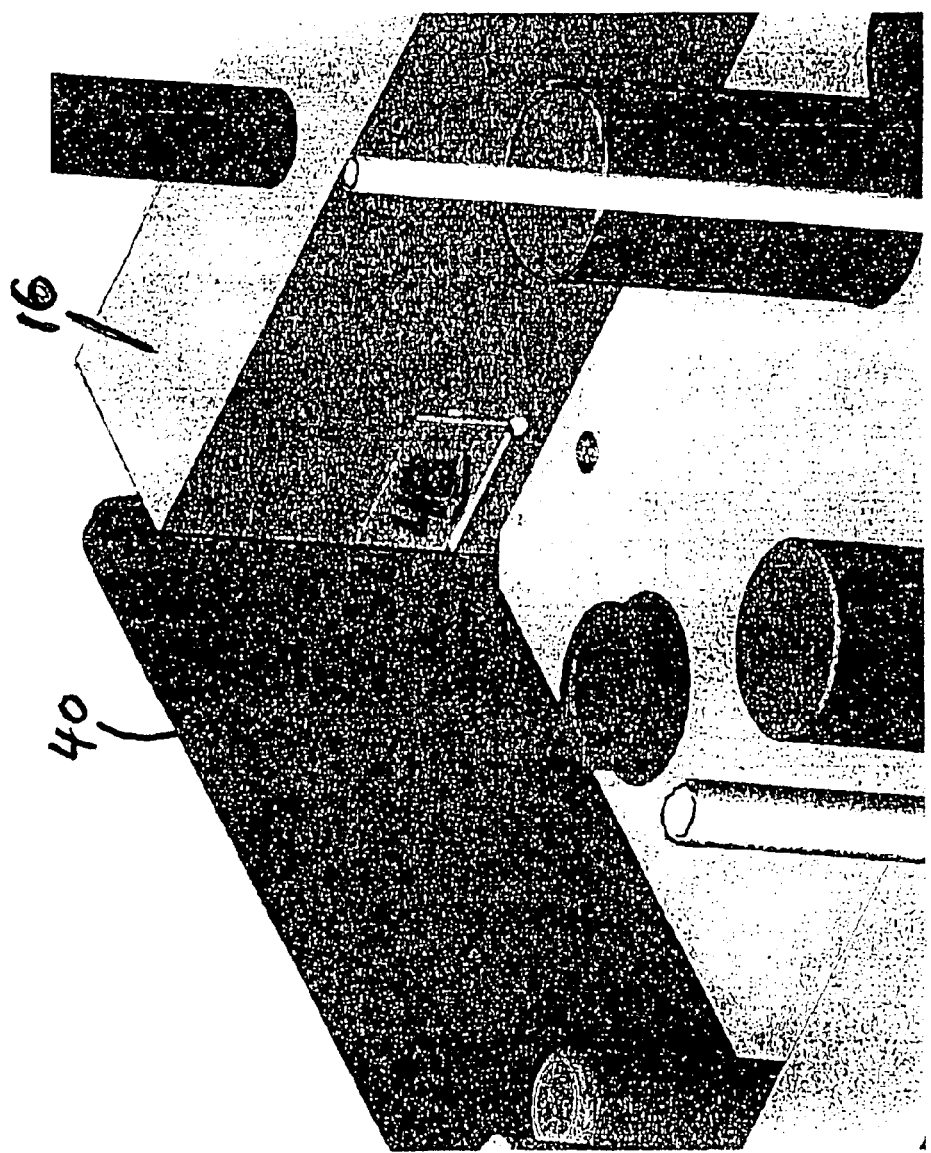
FIG. 7 is perspective and fragmentary view of the cover plate of the present invention attached to the mold with the clip shown in FIG. 6.

Referring now to the drawings and particularly to FIG. 1, a conventional injection mold shown generally as 10 has an ejector housing 12 which includes a bottom 14 and side walls 16, 18. A movable lower support member 20 forms a top for housing 12 and fixedly supports a lower movable cavity core 22. An upper moveable support member 24 is secured to an upper cavity core 26. Support member 20 and cavity core 22 usually move together upwardly and downwardly during the molding operation.

A platen 28 is moveably positioned within the interior opening 30 formed within housing 12. Strain rods and other cooperating structure (not shown) provide a track for movement of upper support member 24 and upper cavity core 26 toward and away from lower support member 20 and lower cavity core 22. An ejecting device 32 is formed from a plurality of individual moveable levers 34 the lower ends of which connect to platen 28. Levers 34 extend upwardly through opening 30, lower support member 20 and lower mold cavity core 22. FIG. 2 illustrates upper ends 36 of levers 34 of ejecting device 32 flush with the upper surface 38 of cavity core 22, the upper cavity core 26 and upper support member 24 removed from the drawing.

The solution to the unwanted material accumulation problem in opening 30 is the provision of a mold opening cover plate shown generally as 40 in FIG. 2. Cover plate 40 has a generally rectangular configuration sufficient in size to provide overlapping closure of the front and back openings 30. The placement of plate 40 over opening 30 is shown in FIG. 2.

To hold cover plate 40 securely over opening 30, a securing material or substance is applied along its perimeter. A very appropriate material is shown in FIGS. 3 and 4 wherein magnetic tape 42 is placed continuously along the perimeter of plate 40. The thickness of the tape need not be great—only enough to insure that the movement of platen 28 is not impeded by its contact and frictional engagement with cover plate 40. A thickness of $1/16^{th}$ inch is sufficient, and an even thinner tape functions quite satisfactorily.

Cover plate 40 may be made of many different materials, however a section of acrylic material combines the natural strength and light weight of that material in a most satisfactory manner to provide a product having an exceptionally long life.

Figure 8:
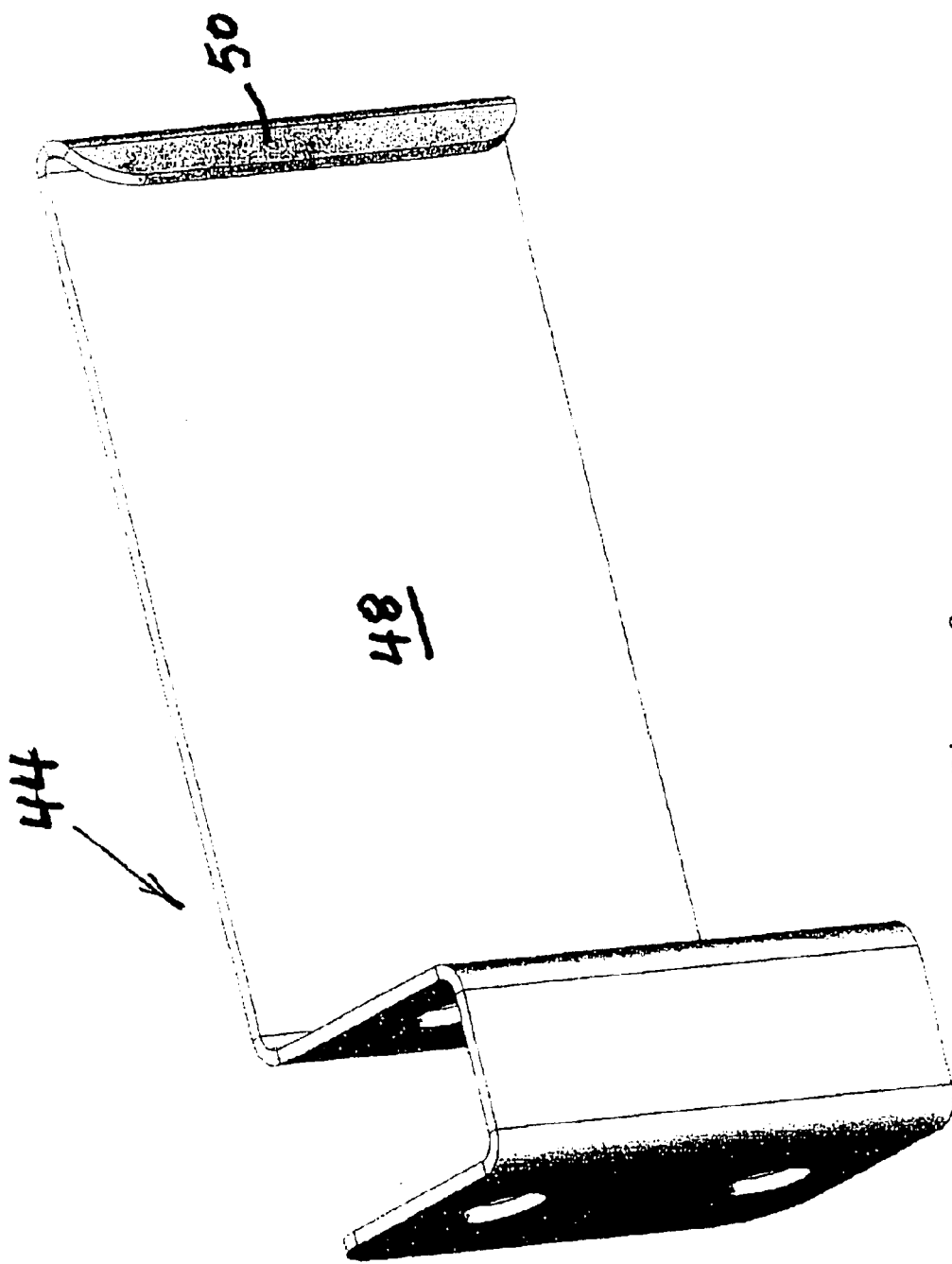
FIG. 8 is an enlarged and perspective view of the clip being used in FIGS. 6 and 7.

Another embodiment of the present invention is shown in FIGS. 5 through 9. Cover plate 40 is affixed to a mold lower portion to cover the opening 30 by a pair of spring clips 44. Clip 44 may be secured to cover plate 40 by rivets, tacks or screws in the manner best shown in FIG. 6, clip 44 here being secured to a vertical edge 46 of cover plate 40 with its extended portion 48 projecting into opening 30. The usual application is to attach one clip 44 to each vertical edge of cover plate 40. The exact configuration of clip 44 is shown in FIG. 8.

A view from the interior of opening 30 showing the securement of cover plate 40 to the interior of side wall 16. Clip extended portion 48 lies flat against the interior of side wall 16 because the bent tab 50 of clip 44 extends into the wall within a slot 52 formed therein. A recess 54 is aligned with slot 52 and extends through the entire thickness of side wall 16.

Figure 9:
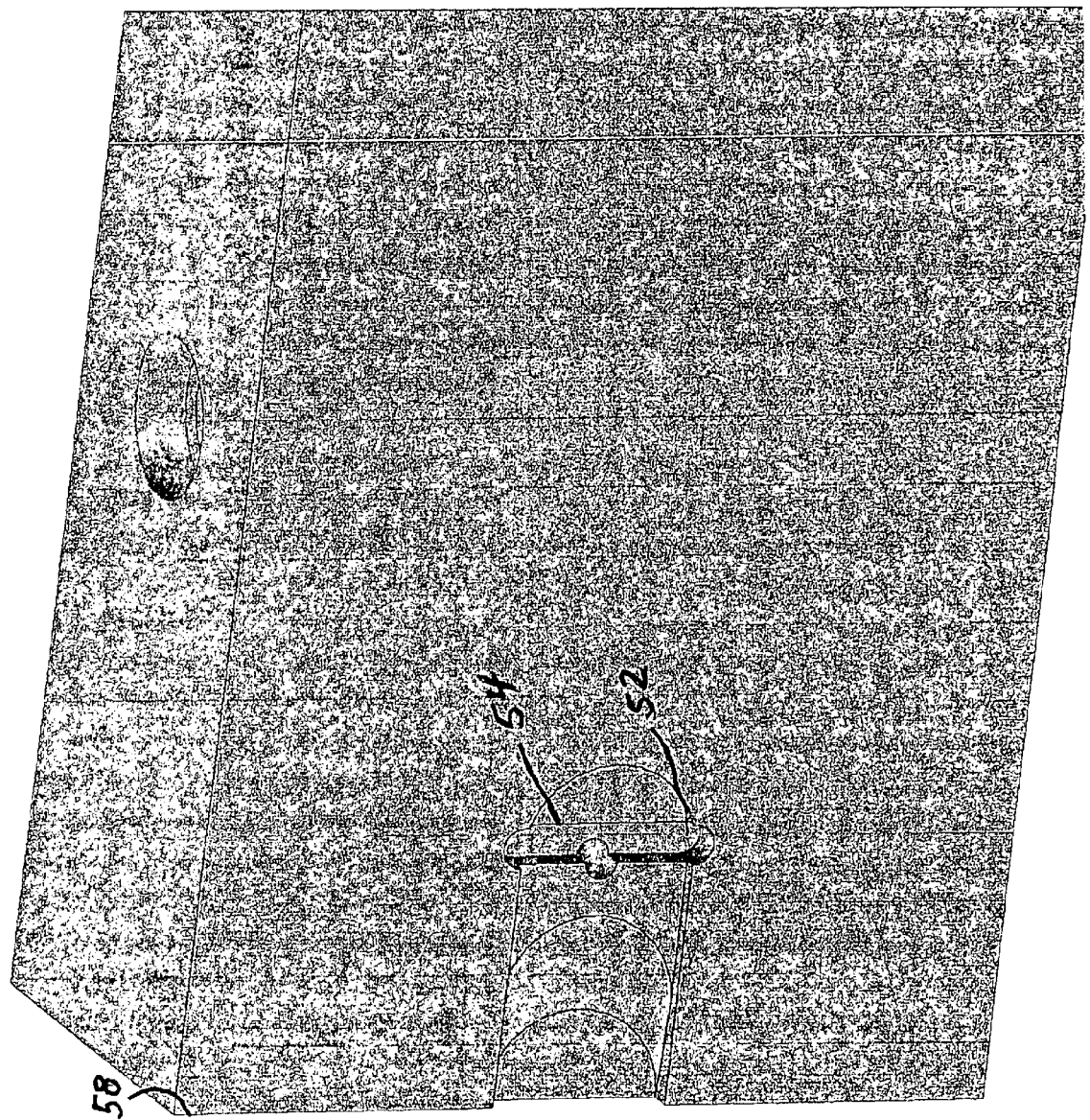
FIG. 9 is a perspective and fragmentary view of the interior of a side wall showing the spring end receiving means, the recess and the inclined ramp used in the embodiment shown in FIGS. 5 through 8.
Figure 1:
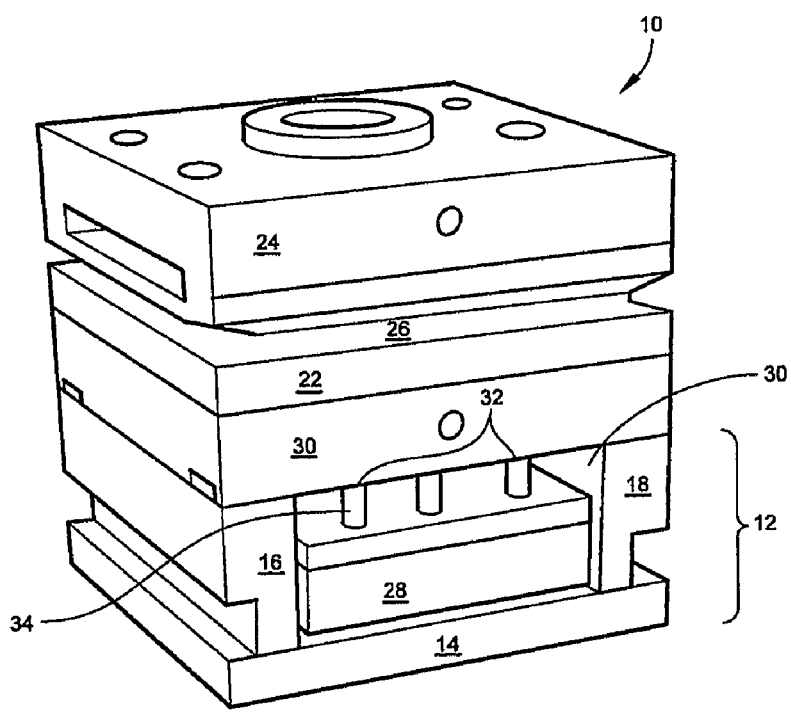
Figure 5:
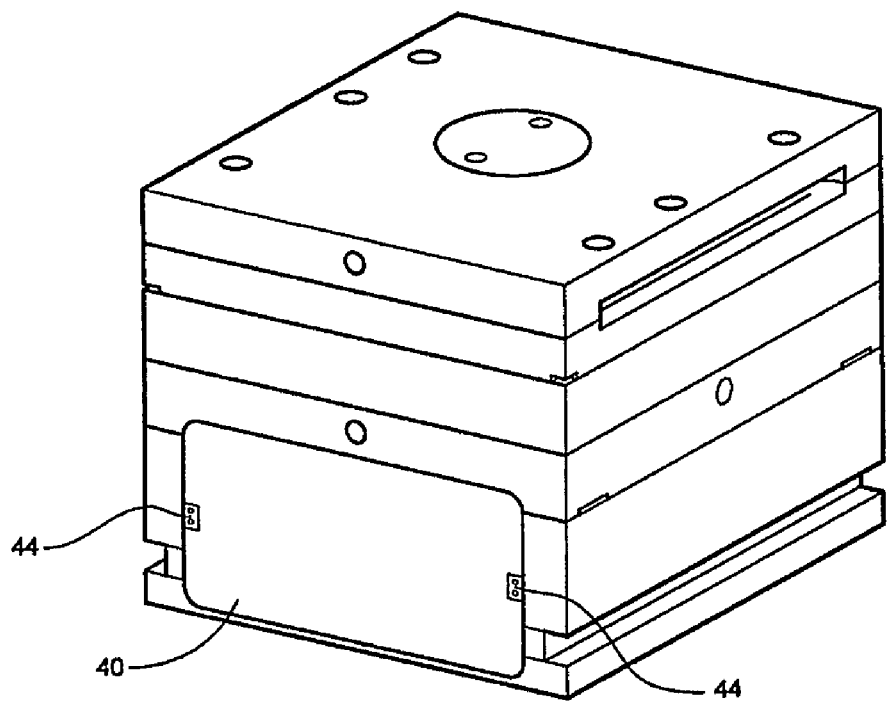
Figure 6:
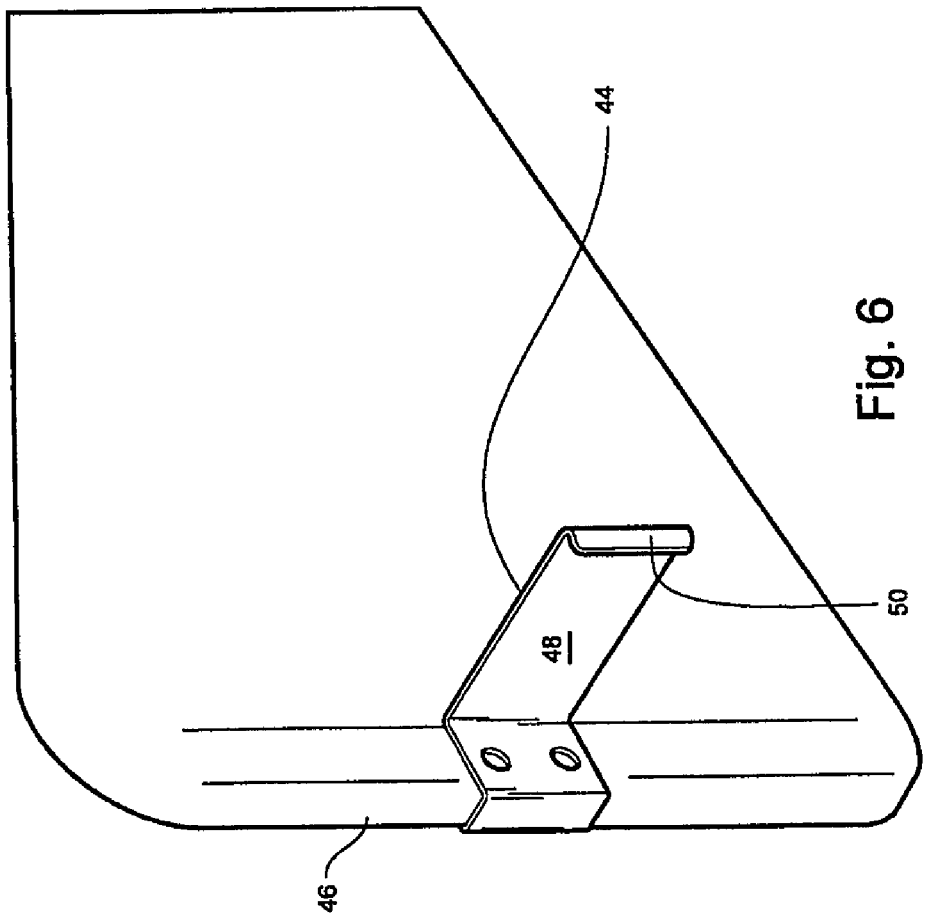
Figure 7:
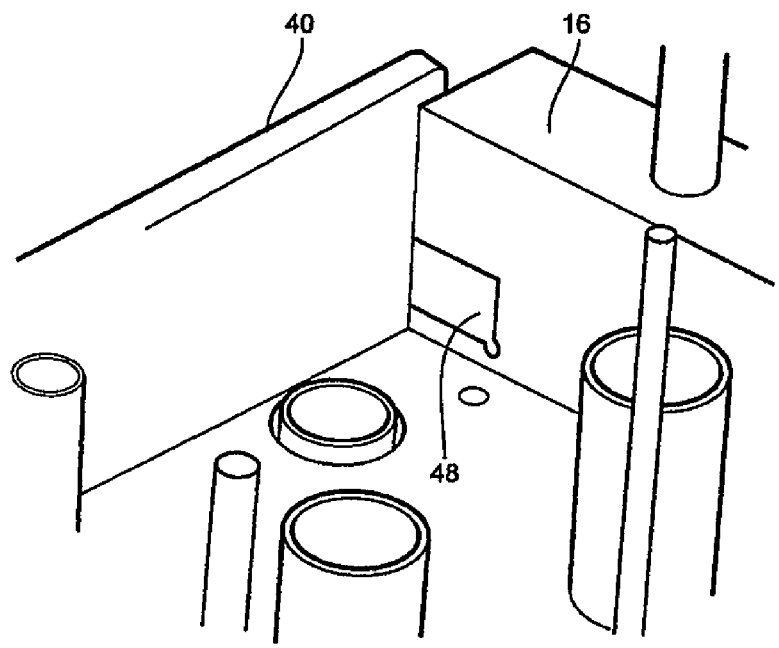
Figure 8:
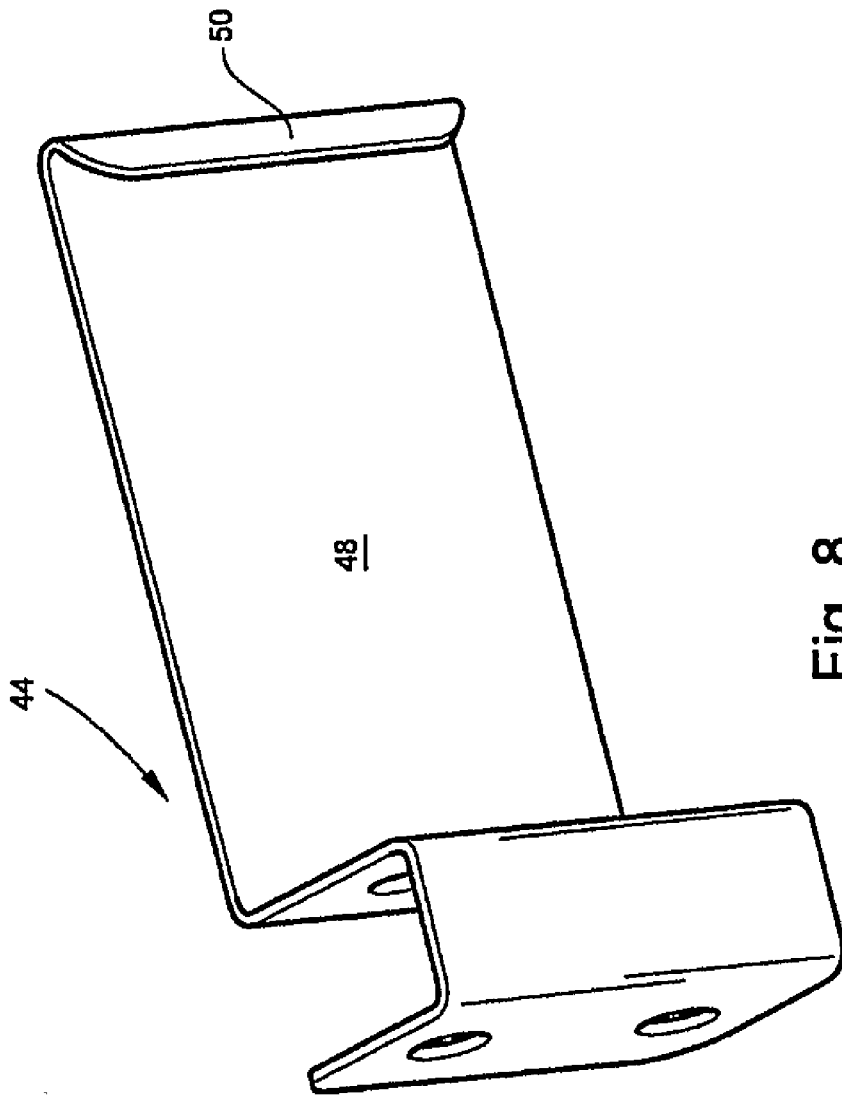

Side walls 16 each have a clip end securing means represented by slot 52 in FIG. 9. An inclined ramp 56 extends from the opening front edge 58 inwardly toward the interior surface of side wall 16 terminating at or near slot 52 and recess 54.

Installation of cover plate 40 in this embodiment is achieved by positioning clip extended portions 48 into inclined ramps 56 at the opening front edges 58. As cover plate 40 is moved toward front opening 30, bent tabs 50 are moved toward each other as inclined ramps force them inwardly toward the opening interior. When they reach slots 52, they spring outwardly into slots 52 and are held firmly by tension in extended portions 48.

Cover plate 40 is removed from the installed position by the use of a tool such as a nail, wire or screw. The tool is extended through each recess 54 to engage bent tab 50 and push it inwardly and cause it rise out of slot 52 and release that side of cover plate 40 from side wall 16. The operation is repeated for the other side of cover plate 40.

Cover plate 40 is ideally suited for another function since its placement over opening 30 provides a very visible location for a manufacturer or distributor to apply its well know logo or corporate name. Such application may well enhance the value of this innovative development.

This invention may be embodied in the primary embodiment described with particularity herein, however it may also be suited for other applications. It may be embodied in other specific forms without departing from the spirit or essential attributes thereof, and it is therefore urged that the preferred embodiments be considered in all respects as illustrative and not restrictive, reference being made to the appended claims rather to the foregoing description to indicate the scope of the invention.

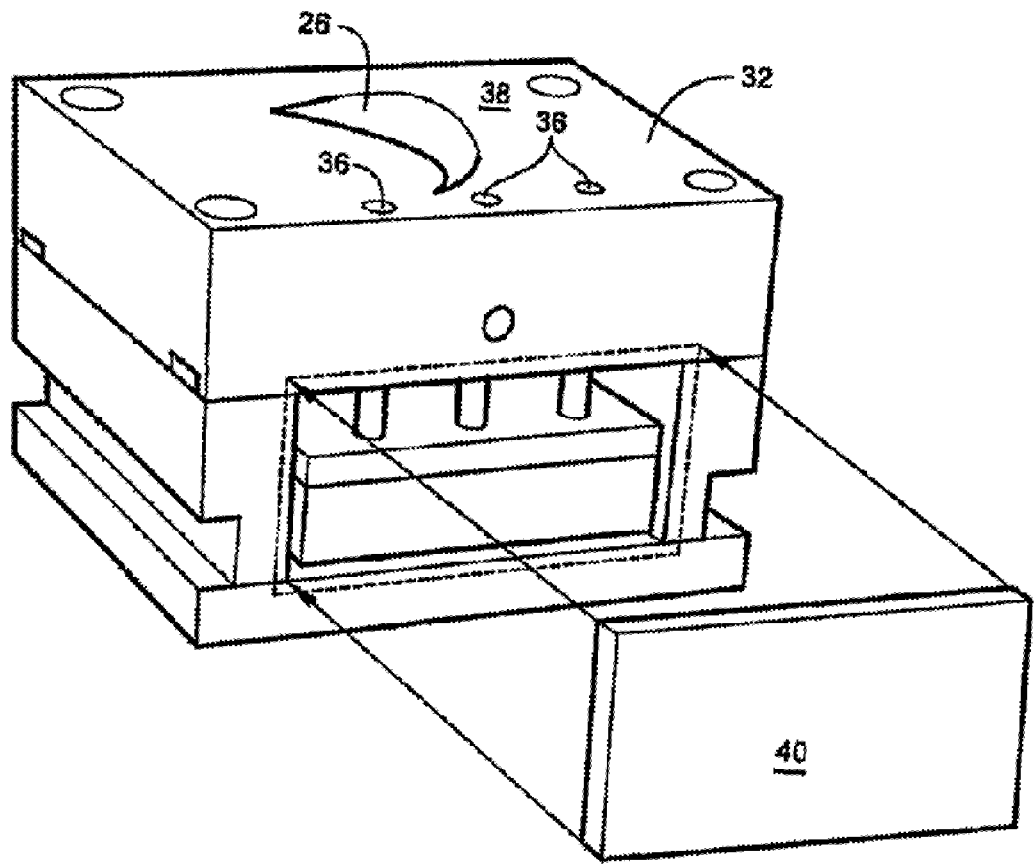

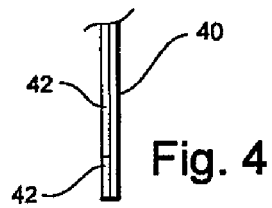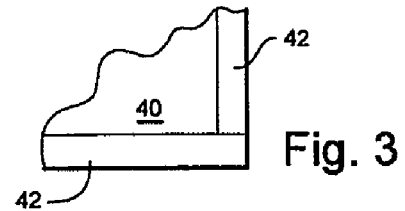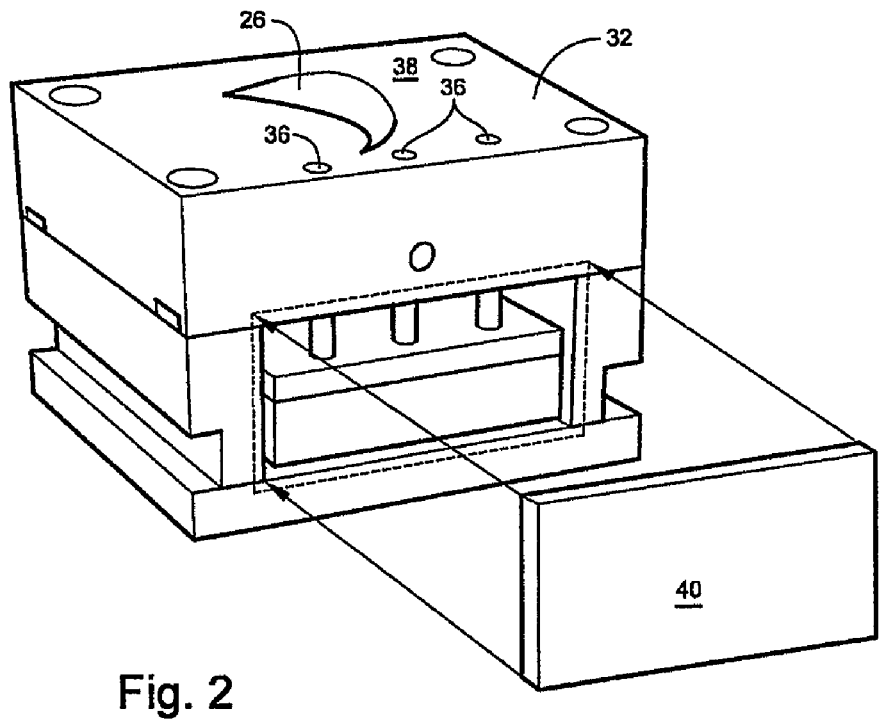

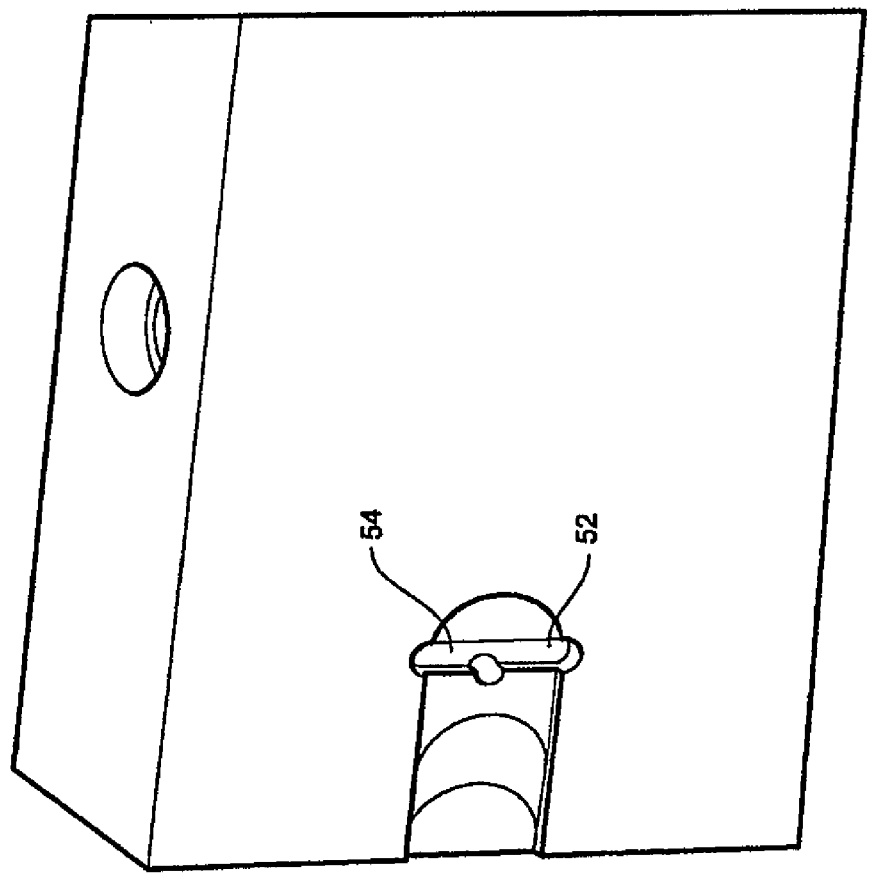

What is claimed is:

1. An injection mold comprising: an upper stationary portion including a support member and an upper cavity core secured to the support member; a lower movable portion including a lower support member, two side walls and a bottom configured with the lower support member to form a housing with at least one opening and a lower cavity core carried by the lower support member, the lower movable portion movable toward the upper stationary portion until the lower cavity core engages the upper cavity core to form a full cavity shaped to make a desired product; ejector means operable to eject molded products from the mold when the upper and lower cavity cores are separated after molding; and an opening cover plate secured at least to the lower support member to close the opening and thereby prevent injury to an attendant and the entry of dust, moisture and other foreign materials into the opening.

2. The mold as claimed in claim 1 wherein the opening cover plate is magnetically secured.

3. The mold as claimed in claim 1 wherein the opening cover plate has selectively positioned magnetic tape to hold the cover plate over the opening.

4. An injection mold comprising: a first support and cavity core portion and a second portion including a lower support member, two side walls and a bottom forming a housing with at least one opening, the lower support member forming a top for the housing, and a lower cavity core carried by the lower support member, the lower portion movable toward the upper portion until the upper and lower portions join to form a fill cavity shaped to make a defined product; an ejector operable to eject molded defined products from the mold when the first and second portions are separated; and a housing opening cover plate secured at least to the bottom to close the opening and thereby prevent injury to an attendant and the entry of dust, moisture and other foreign materials.

5. The mold as claimed in claim 4 wherein the opening cover plate is magnetically secured.

6. The mold as claimed in claim 4 wherein the opening cover plate has selectively positioned magnetic tape to hold the cover plate over the opening.

7. The mold as claimed in claim 4 wherein the opening cover is mechanically secured.

8. The mold as claimed in claim 7 wherein the opening cover plate is secured to the mold and over the opening by at least one clip having a first end and a second end.

9. The mold as claimed in claim 8 wherein the at least one clip first end is fixedly secured to the opening cover plate and the at least one clip second end is releasably secured to the mold.

10. The mold as claimed in claim 9 wherein at least one side wall has a clip second end receiving means, an inclined ramp extending from an opening to the clip second end receiving means and a recess communicating with the clip second end receiving means and extending through the side wall formed to operable receive a tool for releasing the clip second end from the clip second end receiving means.

11. The mold as claimed in claim 10 wherein the opening cover plate is secured over the opening by urging the at least one clip second end along the inclined ramp until it is secured by the clip second end receiving means and is released from the opening when the operable tool is extended through the recess to disengage the clip second end from the clip second end receiving means.

12. The mold as claimed in claim 1 or 4 wherein the opening cover plate is used to display an owner logo or name.

13. In an injection mold having an upper stationary portion including an upper support member and upper cavity core, a lower movable portion having side walls, and a bottom forming a housing with at least one opening, the lower support member forming a top for the housing with an opening, a lower cavity core carried by the lower support member, the lower support portion movable toward the upper stationary portion until the lower cavity core engages the upper cavity core to form a full cavity shaped to make a designed product, an ejector having an interior platen and ejector rods positioned within the opening operable to eject molded products from the mold system when the upper and lower cavity cores are separated after molding, wherein the improvement comprises: a mold opening cover plate secured at least to the lower support member to close the opening and prevent injury to an attendant and the entry of dust, moisture and other foreign materials into the mold opening.

14. The mold as claimed in claim 13 wherein the frame opening cover plate is magnetically secured.

15. The mold as claimed in claim 13 wherein the opening cover plate has selectively positioned magnetic tape to hold the opening cover plate over the mold opening.

16. The mold as claimed in claim 13 wherein the opening cover plate is secured by at least one clip.

17. The mold as claimed in claim 13 wherein the at least one clip is flexible and has a first end and a second end.

18. The mold as claimed in claim 17 wherein the clip first end is secured to the opening cover plate and the second end is secured to the mold.

19. The mold as claimed in claim 13 wherein the opening cover plate is secured to the mold by at least one clip, the clip having a first end fixedly secured to the opening cover plate and a second end releasably secured to the mold.

20. The mold as claimed in claim 19 wherein at least one side wall has a clip second end receiving means, an inclined ramp extending from the opening to the clip second end receiving means, and a recess within the clip end receiving means extending through the side wall formed to operably receive a tool for releasing the clip second end from the clip second end receiving means.

21. The mold as claimed in claim 13 wherein the opening cover plate is used to display a logo or identifying name.

* * * * *

UNITED STATES PATENT AND TRADEMARK OFFICE
CERTIFICATE OF CORRECTION

PATENT NO. : 6,814,567 B2  
APPLICATION NO. : 10/122003  
DATED : November 9, 2004  
INVENTOR(S) : Robison It is certified that error appears in the above-identified patent and that said Letters Patent is hereby corrected as shown below:

Delete Title page illustrating a figure(s), and substitute therefor, new Title page illustrating a figure(s). (attached)

Delete drawing sheet 1-7 and 4A, and substitute therefor drawing sheet 1-7. (attached)

Signed and Sealed this

Second Day of October, 2007

JON W. DUDAS  
*Director of the United States Patent and Trademark Office*

United States Patent
McKovich

(10) Patent No.: US 6,814,567 B2
(45) Date of Patent: Nov. 9, 2004

(54) FRAME CAVITY COVER PLATE FOR INJECTION MOLDING SYSTEM

(76) Inventor: Daniel McKovich, 6849 U. S. Hwy. 158, Stokesdale, NC (US) 27357

(*) Notice: Subject to any disclaimer, the term of this patent is extended or adjusted under 35 U.S.C. 154(b) by 26 days.

(21) Appl. No.: 10/122,003

(22) Filed: Apr. 15, 2002

(65) Prior Publication Data
US 2003/0194465 A1 Oct. 16, 2003

(51) Int. Cl.$^7$ ................................................ B29C 45/40
(52) U.S. Cl. .................. 425/556; 264/334; 425/436 R; 425/444
(58) Field of Search ......................... 425/556, 436 R, 425/441, 443, 73, 151, 210, 135, 544, 116, 444; 264/334

(56) References Cited

U.S. PATENT DOCUMENTS 4,259,052 A * 3/1981 Imanishi et al. .......... 425/135
4,997,355 A * 3/1991 Yamauchi et al. ........ 425/116

* cited by examiner

Primary Examiner—Tim Heitbrink

(57) ABSTRACT

An ejector housing cover plate for an injection mold system having an upper stationary portion and a lower movable portion. The upper portion has a support member and a cavity core, while the lower portion has a frame defining an interior opening, support member and a frame core. An ejector system is positioned within the opening and is movable to eject newly molded products when a molded product has been formed. The opening in the frame can result in the collection of dust, moisture and other foreign materials inside the opening and the possible damage to the mold or ejector system, so an ejector system cover plate is provided. The cover plate covers the opening during operation of the system and when the system is inactive or stored.

21 Claims, 7 Drawing Sheets